(12) United States Patent
Gershinsky et al.

(10) Patent No.: US 8,438,300 B2
(45) Date of Patent: May 7, 2013

(54) ACHIEVING DISTRIBUTED FLOW CONTROL VIA DATA CONFLATION

(75) Inventors: Gidon Gershinsky, Haifa (IL); Liane Lewin-Eytan, Binyamina (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/013,843

(22) Filed: Jan. 26, 2011

(65) Prior Publication Data

US 2011/0185079 A1 Jul. 28, 2011

Related U.S. Application Data

(60) Provisional application No. 61/298,565, filed on Jan. 27, 2010.

(51) Int. Cl.
*G06F 15/16* (2006.01)
(52) U.S. Cl.
USPC .................... 709/233; 709/235; 370/229
(58) Field of Classification Search .................. None
See application file for complete search history.

(56) References Cited

U.S. PATENT DOCUMENTS

| | | | | |
|---|---|---|---|---|
| 5,313,454 A | * | 5/1994 | Bustini et al. | 370/231 |
| 5,367,523 A | * | 11/1994 | Chang et al. | 370/235 |
| 5,633,859 A | * | 5/1997 | Jain et al. | 370/234 |
| 5,668,951 A | * | 9/1997 | Jain et al. | 709/235 |
| 6,337,865 B1 | | 1/2002 | Seto et al. | |
| 6,515,965 B1 | | 2/2003 | Hou et al. | |
| 6,535,482 B1 | * | 3/2003 | Hadi Salim et al. | 370/229 |
| 6,578,082 B1 | | 6/2003 | Ho et al. | |
| 6,868,061 B1 | * | 3/2005 | Kilkki et al. | 370/230.1 |
| 6,922,390 B1 | * | 7/2005 | Chapman et al. | 370/229 |
| 7,000,025 B1 | * | 2/2006 | Wilson | 709/235 |
| 7,369,498 B1 | * | 5/2008 | Ma et al. | 370/235 |
| 7,415,504 B2 | | 8/2008 | Schiavone et al. | |
| 2001/0036820 A1 | | 11/2001 | Fong et al. | |
| 2003/0185249 A1 | | 10/2003 | Davies et al. | |
| 2008/0239988 A1 | | 10/2008 | Ptasinski et al. | |

* cited by examiner

*Primary Examiner* — Oscar Louie
*Assistant Examiner* — Christopher C Harris

(57) ABSTRACT

A distributed method that combines both flow control and smart volume reduction means in a communication network is provided herein. The stages of the method are applied by each node in the network in a distributed way, which adapts to the evolving state of the system. The operations performed by each node in the network are adapted dynamically in a way that adjusts itself to the changes that occur in various parameters of the network. Such parameters include both local node state and also the state of different nodes in the distributed infrastructure. The state of the nodes is characterized by parameters such as transmission rates, available buffer space and the state of data in buffer. The stages are carried out in parallel by the nodes and ordered such that the equality of the data flowing in the network, in terms of delay and specified attributes, is maximized.

23 Claims, 5 Drawing Sheets

ACHIEVING DISTRIBUTED FLOW CONTROL VIA DATA CONFLATION

CROSS REFERENCE TO RELATED APPLICATIONS

This application is a Non-Provisional application claiming priority from U.S. Provisional Application 61/298,565, filed Jan. 27, 2010, entitled "A Method for Distributed Flow Control via Data Conflation" which is incorporated herein by reference in its entirety.

BACKGROUND

1. Technical Field

The present invention relates to a flow control within communication networks and more particularly, to flow control in distributed networks.

2. Discussion of the Related Art

In complex distributed network infrastructures, a massive amount of data is aimed to be transmitted from sources to destinations (aka sinks) at a rate that often exceeds the capacity and the limited resources of the networking infrastructure. Generally, such a problem may occur in any dynamic network setting where congestion may occur due to temporary excess load in different parts of the network.

Excess load is likely to occur in an advanced metering infrastructure (AMI), which is a system that measures, collects and analyzes data originated from advanced metering devices. Advanced metering devices transmit measurements to some central utility for monitoring and control purposes. Such devices are massively deployed so as to cover geographical regions of interest, and are commonly equipped with sensors, transmitting measurements both upon request and on a regular schedule. In such systems, a massive amount of data is produced and transmitted periodically.

An opposite example with respect to the flow direction of data might be a multicast transmission between different domains. One of the main questions in these infrastructures is how to deal with the massive amount of data to be transmitted online, in a way that both ensures the transmission of data with a high quality level and minimizes end-to-end delivery times.

Two main well-known approaches for dealing with such problems are flow control and volume reduction. Flow control is the process of managing the rate of data transmission between two nodes to prevent the sender from overwhelming the receiver. Rates are decreased by delaying transmission of messages, resulting in a transmission slowdown and in an increase of the end-to-end delay. Volume reduction consists of performing some operations on the data so as to decrease its total amount. Existing volume reduction methods are commonly either generic algorithms or application-specific discarding policies. While the existing approaches may alleviate the problem to a certain degree, none can solve it entirely in a sufficiently wide range of scenarios and applications.

The state of the infrastructures in the aforementioned networks evolves dynamically during the system operation, both in terms of rates and the nature of data to be transmitted. An important challenge is to cope with the congestion problem in a distributed way, exploiting the resources in the whole networking infrastructure.

BRIEF SUMMARY

One aspect of the invention provides a distributed method that combines both flow control and smart volume reduction means. The stages of the method of embodiments of the present invention are applied by each node in the system in a distributed way, which adapts to the evolving state of the system. The operations performed by each node in the system are adapted dynamically in a way that adjusts itself to the changes that occur in various parameters of the system. Such parameters consist both of the local node state, but also of the state of different nodes in the distributed infrastructure. The state of the nodes is characterized by parameters such as transmission rates, available buffer space and the state of data in buffer.

The networking infrastructure being considered consists of sources, sinks and intermediate nodes. The intermediate nodes are placed at the transitional levels of the system, where each such node may have several inputs and outputs. The flow control and conflation method according to embodiments of the present invention uses the evolving state of the intermediate nodes in a distributed way, so as to maximize the value of the data that is transmitted to the sinks while minimizing its end-to-end delay. The value of the data received by the sink may be evaluated by different properties assigned to each message such as priority.

The quality of the communication network is measured by a global function that measures the quality of the data that is received by the sink by terms of its value and delay. The means by which the method according to embodiments of the invention is applied are distributed over the intermediate nodes of the system as follows. Each intermediate node performs periodic local decisions based on control data communicated from the other relevant intermediate nodes in the system. At each such step an intermediate node may apply one or more of the following flow control and conflation means:

(i) Performing a volume reduction of the messages in its buffer by performing a smart filtering of the data it currently holds;

(ii) Performing a back-pressure asking previous intermediate nodes that comprise its input to decrease their outgoing rates; and (iii) Performing a forth-pressure by increasing its outgoing rate in its different outputs.

It is noted that the (i) operation is a volume reduction mean, while (ii) and (iii) are flow traffic means. Each of the above operations might influence the overall quality of the system in a different way. Thus, they are applied by each node in a way that is both suitable with respect to the state of the system, and that maximizes the quality of the transferred data. By applying the back and forth pressure operations, high-priority data might be held in buffers of preceding or subsequent nodes in the system, instead of being filtered by the congested node. Clearly, applying such flow control operations whenever possible and combining them with volume reduction operations will result in an increase of the data quality in the system.

Embodiments of the present invention may include: a specification of the overall quality function of the system; a distributed protocol run at each intermediate node, consisting of: control data exchanged between nodes; and a protocol run locally at each node, determining the calculations and possible operations (i)-(iii) performed by the node.

Other aspects of the invention may include a system and a computer readable computer readable program configured to execute the aforementioned system. These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
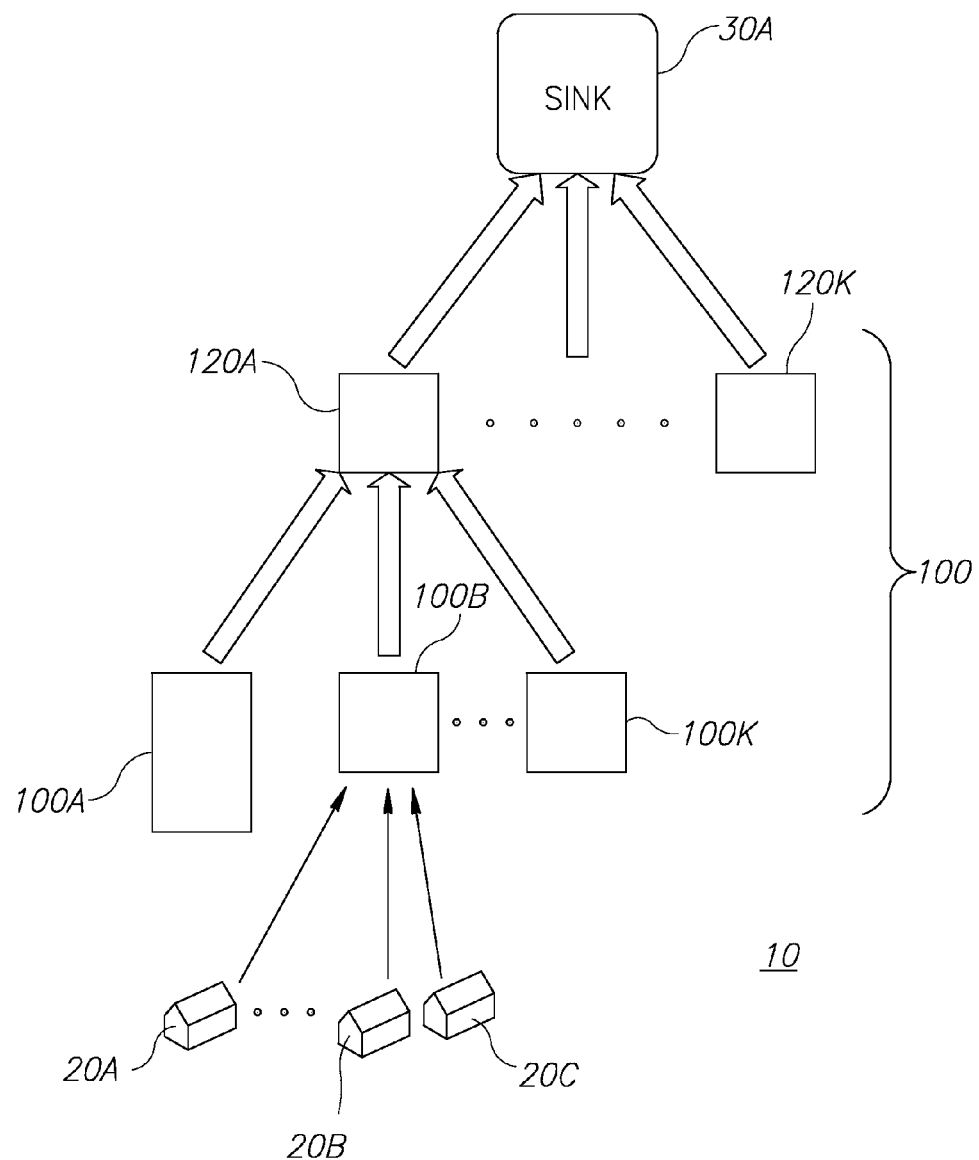
FIG. 1 is a high level schematic block diagram illustrating the environment of the communication network according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating the environment of the communication network according to some embodiments of the invention. Communication network 10 includes one or more sources 20A-20C and at least one sink 30A. data messages are flowing from any of sources 20A-20C to sink 30A via a plurality of levels of multiple nodes 100A-120K connected to each other via multiple inputs and multiple outputs, such that each one of nodes 100A-120K may communicate with any of the other nodes on communication network 10.

It should be noted that while embodiments of the present invention relate to managing traffic over a general distributed system, for the sake of simplicity, communication network 10 is depicted, in a non limiting manner, as a hierarchical network where sources 20A-20C are numerous and are located at the bottom of the hierarchy, and there is at least one sink 30A at the top of the hierarchy. Intermediate nodes 100A-120K are placed at the transitional levels of the hierarchy.

A non limiting example of such hierarchical networks are advanced metering infrastructures such as smart energy grids, where the goal is to transmit massive amount of data consisting of dynamic electricity usage measurements performed by a great number of users to a central control and data center. Such networks consist of a hierarchical structure, where the sink represents the central station (operator), and the sources correspond to the different consumers. Each inner (intermediate) node of the hierarchy corresponds to a network device such as a server with some application logic. Each such node receives the data from its child nodes, and transmits data to its parent node.

Figure 2:
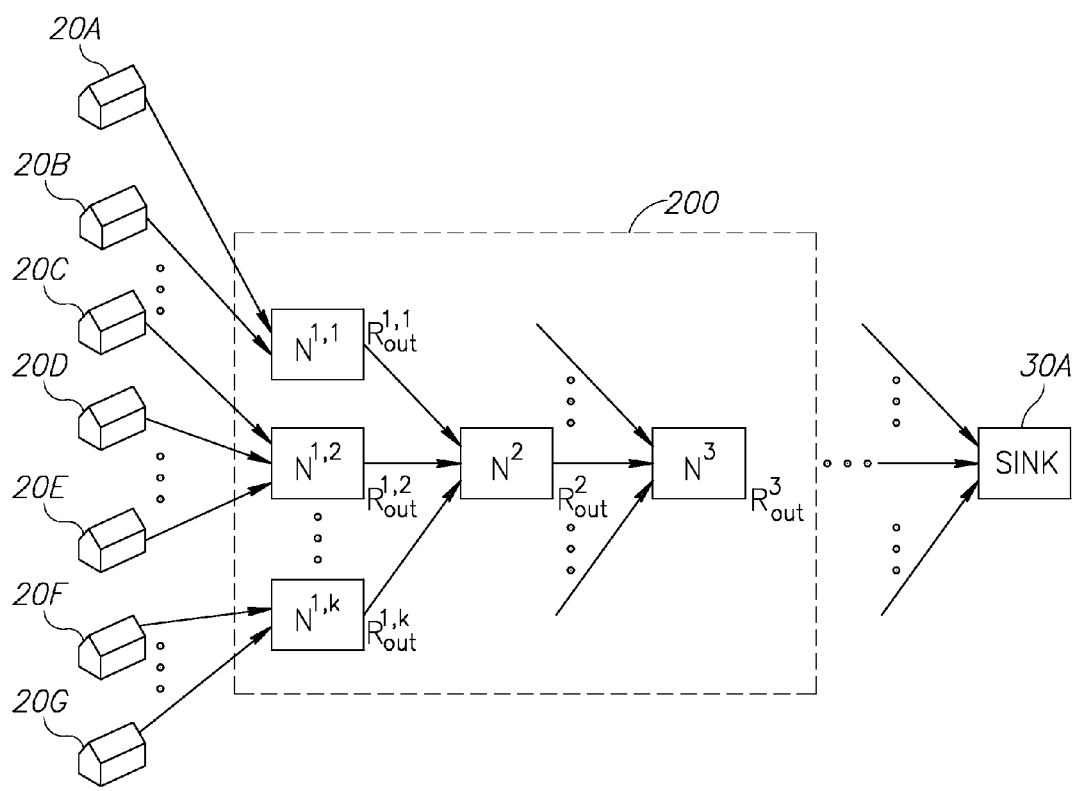
FIG. 2 is a high level schematic block diagram illustrating the specified neighboring nodes within the communication network according to some embodiments of the invention.

Referring now to FIG. 2, a high level schematic block diagram illustrating communication network 10 including a sink 30A and one or more sources 20A-20G. Also shown are specified neighboring nodes 200, referred to as the virtual node selected from the intermediate nodes of communication network 10. The present invention, in embodiments thereof, shows how information gathered by each one of the specified nodes from its neighbors are used to carry out a data flow control that takes into account the infrastructure constraints of the each and every nodes within the specified nodes, and further relate to the attributes of the messages flowing through communication network 10.

The object of embodiments of the present invention is to maximize the quality of the data transmitted to sink 30A, in terms of value of the messages and the respective delay in delivery, given the limited resources of the hierarchical infrastructure, and how it combines distributed flow control and conflation means over the different levels of the hierarchy.

In order to quantify the communication network, both from infrastructure point of view and data point of view, several parameters characterizing the data transmitted over the network infrastructure and the parameters characterizing each node in the hierarchy have been selected.

The parameters characterizing the data include attributes and latency. Specifically, each message $m_i$ originated from a source carries an attribute, such as, but not limited to, priority $p_i$. Once a message $m_i$ arrives to the sink, its latency is denoted by $l_i$, which measures the source-to-sink delay of $m_i$.

The parameters characterizing the infrastructure, or the intermediate nodes, include a buffer size and input and output rates respectively. Specifically, each intermediate node j is characterized by the following parameters, $R^j_{in}$—aggregated rate of the data received by node j, over the multiple inputs of j. $R^j_{out}$—rate of the data transmitted by node j. $B^j$—buffer space of node j.

The aforementioned parameters may be used to calculate volume reduction ratio being the ratio of data to be reduced from the buffer in order to avoid buffer overflow. Specifically, given a node with buffer space B, amount of data D in buffer, input rate $R_{in}$ and output rate $R_{out}$, $\lambda$ denotes the volume reduction ratio which is a function of all above parameters $\lambda=f(B, D, R_{in}, R_{out})$.

The actual calculating of $\lambda$ may be carried out in various ways. One way for example, is by the formula disclosed in Non-Provisional application Ser. No. 13/008,918 filed Jan. 19, 2011, entitled "Adaptive Traffic Management via Analytics-Based Volume Reduction" which is incorporated herein by reference in its entirety.

In order to achieve an optimization of the quality of the data transmitted by the communication network, a global quality function that quantifies the quality is required. According to embodiment of the invention, the global quality function estimates the quality of the data received by the sink, with respect to the data transmitted from the sources. Clearly, the quality of such data can be estimated over a finite given period of time T.

Consistent with some embodiments of the invention, the quality of the data is quantified both by its attribute and its end-to-end delivery time. For the sake of simplicity, the description below relates to priority as a non limiting example of attribute. It is should be clear that other attributes may be used.

In order to formulate the quality function, each priority p is associated with a weight w(p), where the weight is a non-decreasing function of the priority quantifying the quality of the data with respect to its priority. Furthermore, a cost function c(l,p) provides a non-decreasing function depending both on the delay l and priority p. The cost function c(l,p) quantifies the cost incurring by delay l for a message with priority p. $l_{min}$ denotes the minimum source-to-sink delay of a message in the system.

It is assumed that the sources are located at the same distance from the sink, and thus consider a uniform parameter $l_{min}$, however settings where this assumption does not hold can be analyzed similarly, by considering for each path $p_i$ its minimum delay $l^i_{min}$. As each message $m_i$ carries a priority $p_i$, the global quality function is formulated in Equation 1 as follows:

$$Q(p, l) = \underbrace{\frac{\sum_{m_i \in in(sink)} w(p_i)}{\sum_{m_i \in out(sources)} w(p_i)}}_{(Q1)} \cdot \underbrace{\frac{\sum_{m_i \in in(sink)} c(l_{min}, p_i)}{\sum_{m_i \in in(sink)} c(l_i, p_i)}}_{(Q2)} \quad (1)$$

Wherein: the left side ratio, denoted by Q1, determines the overall quality of the data received by the sink with respect to the overall quality of the data originated from the sources (over interval T). The right side ratio denoted by Q2, represents the minimum possible latency cost of the data received by the sink, over its actual overall end-to-end delay cost. Thus, $0 < Q(p,l) \leq 1$, where Q=1 corresponds to the optimal data quality in the system.

In order to maximize the quality level of the data flowing through the communication network the best possible quality of the data received by the sink should be reached. This is achieved by distributing the flow control means over the different levels of hierarchy.

The following is a description of a control protocol carried out by the nodes in order to implement the maximizing of the quality function. Again, the protocol is described within a hierarchical infrastructure for the sake of simplicity. It should be noted that embodiments of the present invention may be carried out effectively on other more general forms of distributed networks.

A specified number of consecutive (neighboring) nodes are selected from plurality of nodes in the hierarchical infrastructure. For the sake of simplicity, only adjacent nodes belonging to three levels of hierarchy. Nodes are denoted by $N^{1,1}$, $N^{1,2}$, $N^{1,k}$; $N^2$ and $N^3$, where $N^{1,1}$-$N^{1,k}$ are k nodes at the first level transmitting to $N^2$, and $N^2$ transmits to $N^3$.

Consistent with some embodiments of the invention a protocol where each node $N^j$ performs local calculations and decisions based on the data communicated from its neighbors, namely nodes $N^{j-1,1}, \ldots, N^{j-1,k}$ and $N^{j+1}$ is disclosed. For the sake of the example, node $N^2$ will be the focus of the following description, wherein nodes $N^{1,1}, \ldots, N^{1,k}$ and, $N^3$ are the neighboring nodes.

At each time interval T, node $N^2$ may apply the following flow control means: (i) performing a volume reduction of the messages in $B^2$; (ii) performing a back-pressure asking some of nodes $N^{1,1}$-$N^{1,k}$ to decrease their respective output rates $R^{1,1}_{out}$-$R^{1,k}_{out}$, achieving a decrease in the input rate $R^2_{in}=\Sigma_j R^{1,j}_{out}$; and (iii) performing a forth-pressure by increasing $R^2_{out}$.

Each one of the above means allows $N^2$ to deal with a congested state, where its aggregated input rate exceeds its buffer space and current output rate. However, each possibility affects in a different way the quality of the data that will be transmitted up-hierarchy: means (i) reduces term Q1 in Equation 1, means (ii) reduces term Q2 in Equation 1, while the means (iii) is optimal in both terms, assuming it can be applied. It should be noted however, that means (iii) can only be applied in case there is space in the buffer of the subsequent node, or in case it can be required to perform more filtering.

Figure 4:
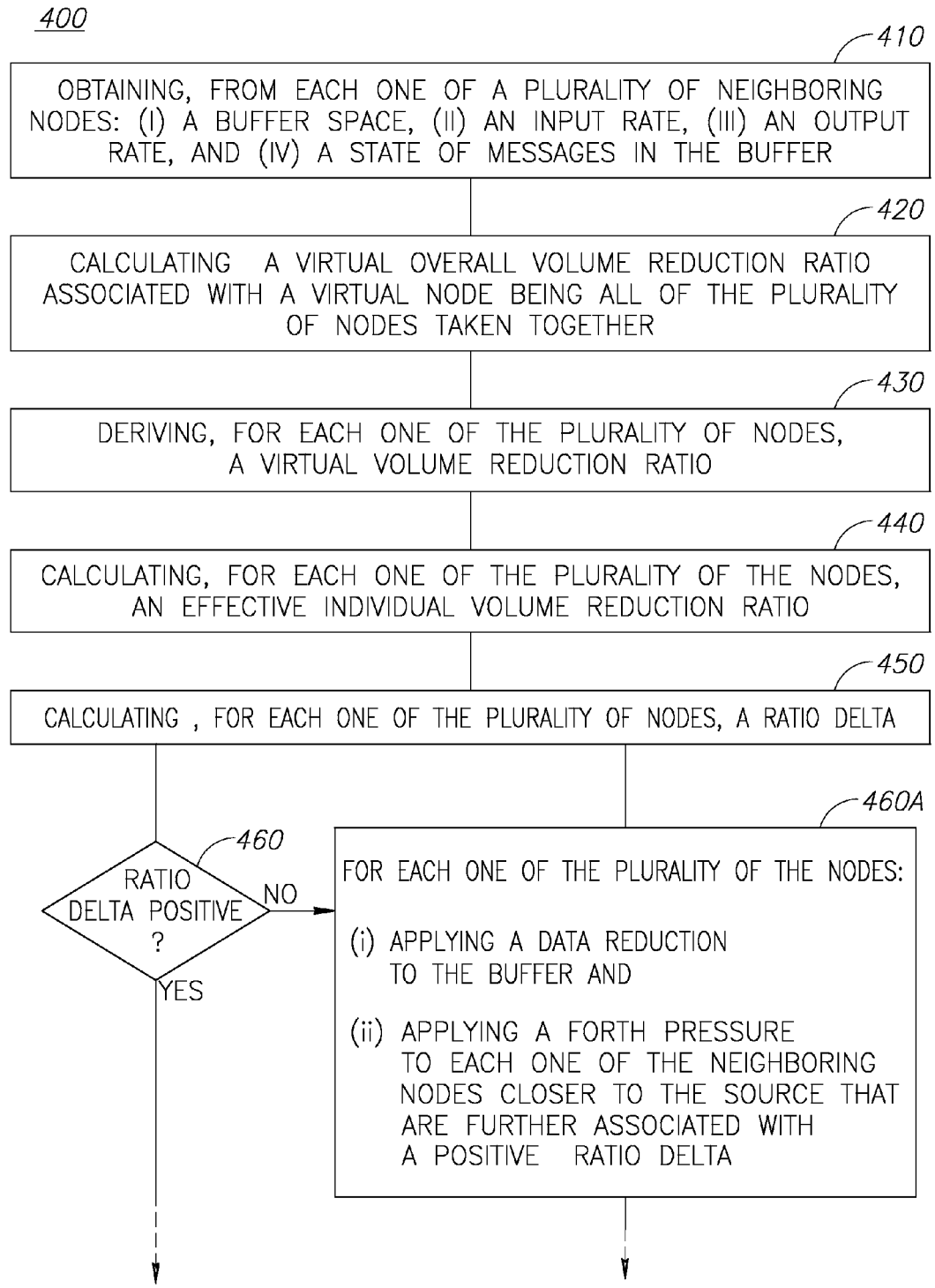
FIG. 4 is a high level flowchart diagram illustrating a method according to some embodiments of the invention.
Figure 4:
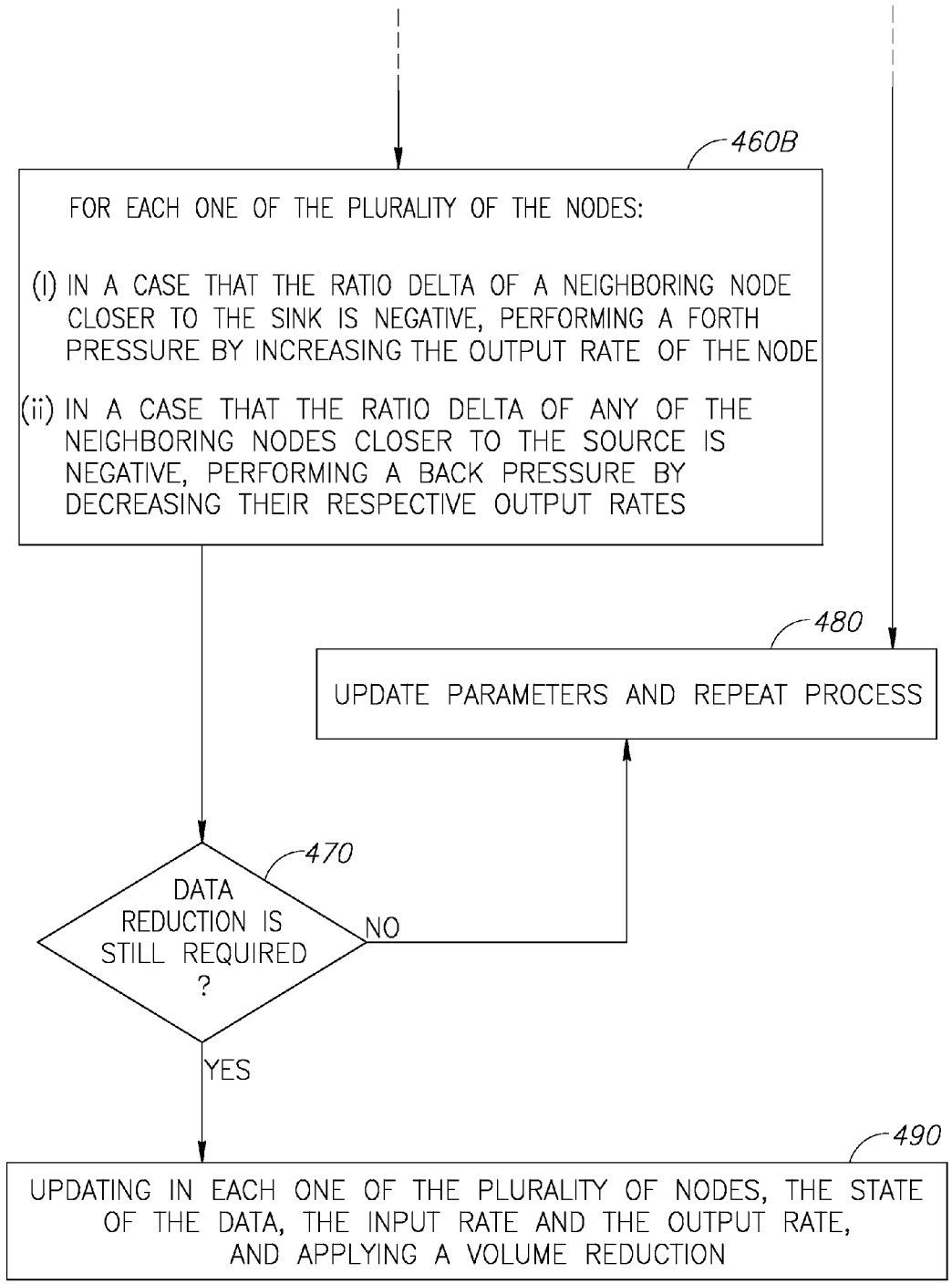

FIG. 4 is a high level flowchart diagram illustrating a generalized method 400 according to some embodiments of the invention. A specific implementation of this method is shown further below in this description. Method 400 begins with obtaining parameters from specified neighboring node of a plurality of nodes 410, the parameters comprising: (i) a buffer space, (ii) an input rate, (iii) an output rate, and (iv) a state of messages in the buffer indicative of a number of messages of each attribute. The method goes on to a stage of calculating a virtual overall volume reduction ratio 420 associated with a virtual node being all of the specified nodes combined together, wherein the virtual reduction ratio represents the ratio of data to be reduced from a buffer in order to avoid buffer overflow, based on (i) a total buffer space, (ii) a total size of the massages, (iii) an input rate, and (iv) an output rate, all of the virtual node. The method goes on to deriving, for each one of the specified nodes, a virtual volume reduction ratio 430, representing a share of the node in the virtual overall volume reduction ratio. Then, method 400 proceeds to the stage of calculating, for each one of the specified nodes, an effective individual volume reduction ratio 440 being the ratio of data the node should discard from its buffer had it been alone in the communication network, in order to avoid buffer overflow. Then comes the stage of calculating, for each one of the specified nodes, a ratio delta being a difference between the effective and the virtual reduction ratios 450.

The ratio delta is then checked 460. In the case the ratio delta is non-positive, for each one of the specified nodes: (i) applying a data reduction to the buffer; and (ii) applying a forth pressure to each one of the neighboring nodes located closer to the source that are further associated with a positive ratio delta by increasing their output rates 460A. Then, the parameters are updated and the entire process is repeated 480.

In the case the ratio delta is positive, for each one of the specified nodes: (i) in a case that the ratio delta of a neighboring node closer to the sink is negative, performing a forth pressure by increasing the output rate of the node, thus increasing the input rate of the neighboring node closer to the sink; and (ii) in a case that the ratio delta of any of the neighboring nodes closer to the source is negative, performing a back pressure by decreasing their respective output rates 460B. Then, a check whether further data reduction is required is carried out 470. If no further reduction is required, the parameters are updated and the entire process is repeated 480. In case further data reduction is required, the parameters are updated and a reduction is carried out 490.

Figure 3:
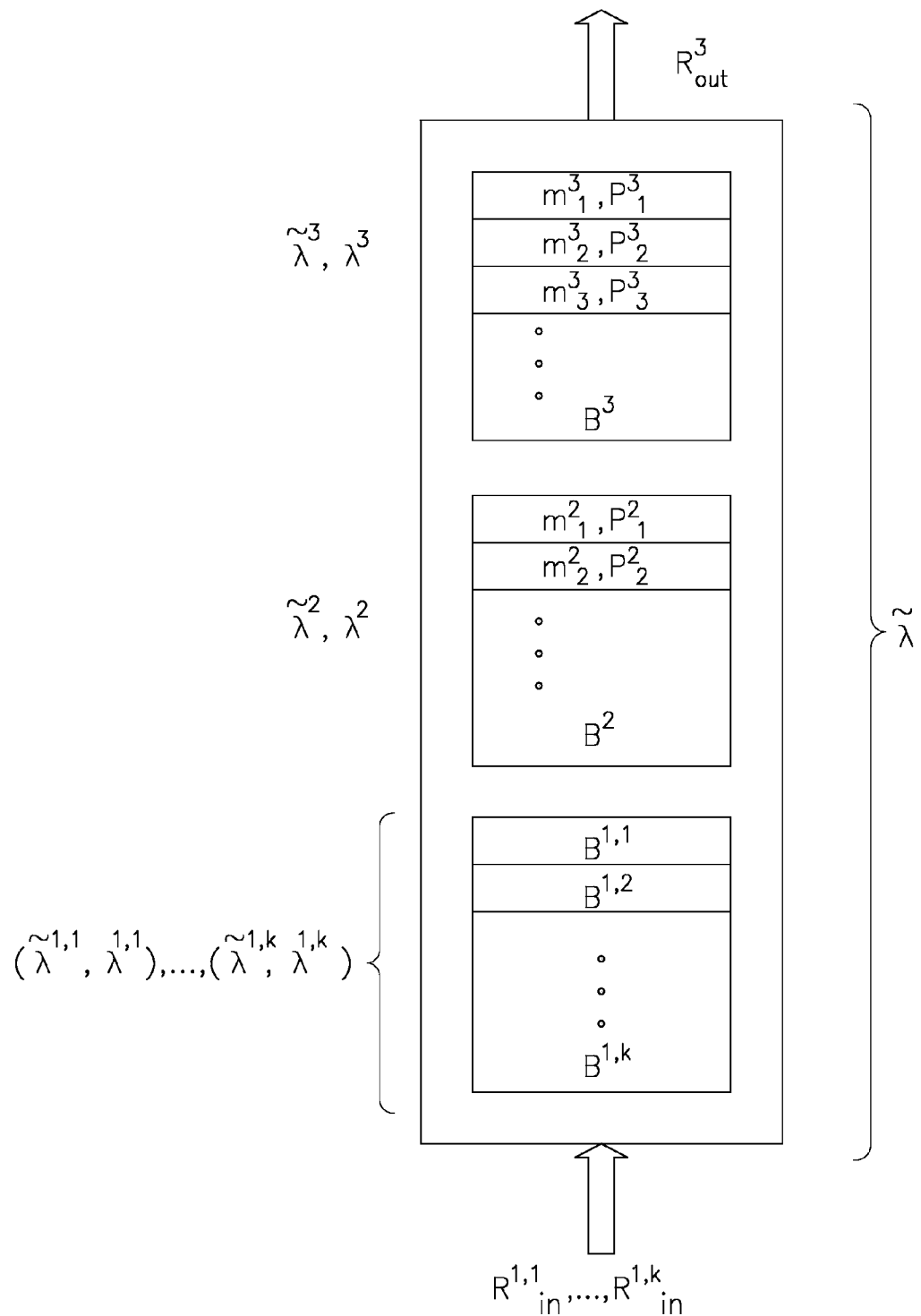
FIG. 3 is a diagram illustrating an aspect according to some embodiments of the invention.

In the rest of the description, a non limiting example of a hierarchical three level virtual node is discussed in relation with reference to FIG. 2 and FIG. 3. It should again be noted that although the following example is provided for three hierarchy levels, a similar approach may involve any number of levels—from two and up to the maximal hierarchy length. In addition, a modified algorithm may be implemented similarly in a non-hierarchical architecture of a communication network.

At each time interval T, each node j transmits to its neighbors the following parameters characterizing its state. The parameters are: (i) buffer space $B^j$, (ii) input rates $R^j_{in}$, (iii) output $R^j_{out}$; and (iv) the state of messages in the buffer, that may be represented as a vector $(x_1, \ldots, x_d)$ where $x_k$ corresponds to the number of messages (or total size in bytes) with priority k in $B^j$, and [1,d] is the scale of possible priorities. It is noted that the message state can include other attributes characterizing the data in the buffer (apart from priority).

Focusing again on intermediate node $N^2$ and given the states of its neighbors and its individual state, node $N^2$ performs the following calculations: Given $R^{1,1}_{in}$-$R^{1,k}_{in}$, $R^3_{out}$, the total buffer space $$\sum_j B^{1,j} + B^2 + B^3$$

and the messages state in each buffer, consider the nodes $N^{1,1}$-$N^{1,k}$, $N^2$, $N^3$ as a virtual node 200 and compute the virtual overall volume reduction ratio $\tilde{\lambda}$. The volume reduction ratio determines the ratio of data to be reduced from a buffer in order to avoid buffer overflow, and is thus a function of the input and output rate, as well as buffer free space.

In the virtual node 200 all of the buffers of $N^2$ and its neighbors are considered as a single virtual buffer, with input rate equal to $\Sigma_j R^{1,j}_{in}$ and output rate $R^3_{out}$. Thus, $\tilde{\lambda}$ is a function of all above parameters, that is, $$\tilde{\lambda} = f\left(\sum_j B^{1,j} + B^2 + B^3, \Sigma D, \Sigma_j R^{1,j}_{in}, R^3_{out}\right),$$

where $\Sigma D$ denotes the total size of data in all respective buffers.

It is then possible, using the messages state of $N^{1,1}$-$N^{1,k}$, $N^2$, $N^3$, to derive from $\tilde{\lambda}$ the respective virtual reduction ratios $\tilde{\lambda}^{1,1}$-$\tilde{\lambda}^{1,k}$, $\tilde{\lambda}^2$, $\tilde{\lambda}^3$ of the respective nodes. These ratios may be derived by looking at the total number of messages of each priority in all buffers, and reaching $\tilde{\lambda}$ by reducing the messages from low to high priority. Then, by following the real buffer origin of each message, we know exactly how much data should be reduced from each buffer, and derive its virtual reduction ratio accordingly. The relationship between $\tilde{\lambda}$ and $\tilde{\lambda}^{1,1}$-$\tilde{\lambda}^{1,k}$, $\tilde{\lambda}^2$, $\tilde{\lambda}^3$, the messages and the buffer size within the virtual node is illustrated in FIG. 3.

Given the rates and buffers parameters of its neighbors, node $N^2$ calculates the effective individual volume reduction ratio of each node $-\lambda^{1,1}$-$\lambda^{1,k}$, $\lambda^2$, $\lambda^3$. The effective volume reduction ratio of a node is the ratio of data it should discard from its buffer would it be alone in the system, in order to avoid buffer overflow.

The algorithm goes on to calculate a ratio delta denoted by $\Delta\lambda^j=\lambda^j-\tilde{\lambda}^j$, that is, the difference between the effective and virtual individual ratio. The meaning of a positive value $\Delta\lambda^j<0$, is that the effective individual volume reduction $\lambda^j$ of the node is higher than the virtual volume reduction $\tilde{\lambda}^j$, which is also the optimal ratio. In other words, the amount of data a node would have to reduce if it was alone in the system is higher than if considering $N^j$ and all its neighbors as a single virtual node and try using their buffer resources. In this case, instead of performing some extra filtering (compared to the optimal filtering), the node should use its distributed flow control means, that is, back and forth pressure in order to minimize the volume reduction that it will perform individually. By using back and forth pressure means, the node will in fact use the buffer resources of its neighbors, and decrease the amount of filtering it should perform locally.

In case $\Delta\lambda^j \leq 0$, node $N^j$ will perform an individual volume reduction operation on its buffer (according to $\lambda^j$). In addition, it will compute and communicate the forth pressure that can be performed by each of its lower order neighbors having a positive value $\Delta\lambda$ (that is, the value by which each of them can increase its outgoing rate). This computation will be performed so that $\Delta\lambda^j$ remains negative given the updated total incoming rate $R^j_{in}$ of $N^j$. We note that the possible total forth-pressure to $N^j$ will be divided between its lower order neighbors proportionally to their (positive) value $\Delta\lambda$, where a higher value should result in a higher forth pressure.

Referring back to node $N^2$, described below is the case where $\Delta\lambda^2>0$. The exact amount of back and forth pressure will be applied with respect to $\Delta\lambda^{1,1}$-$\Delta\lambda^{1,k}$ and $\Delta\lambda^3$, as follows, by the specified order of appliance: (i) In case $\Delta\lambda^3<0$, perform a forth-pressure by increasing $R^2_{out}$ (thus increasing $R^3_{in}$). The value by which $R^2_{out}$ can be increased is upper-bounded by the value as communicated by $N^3$. Note that applying this possibility is optimal with respect to the overall quality function, and it is thus the first one to be applied. (ii) In case any of $\Delta\lambda^{1,j} \in \{\Delta\lambda^{1,1}, \ldots, \Delta\lambda^{1,k}\}$ is negative, perform a back-pressure by decreasing $R^{1,j}_{out}$ (and thus decreasing $R^2_{in}$). Applying this possibility is the best sub-optimal possibility after applying the first one, as it will decrease Q2, but will not affect Q1 in Equation 1. Again, the decrease of $R^{1,j}_{out}$ should be performed such that the resulting $\Delta\lambda^{1,j}$ remains negative.

In case there are several nodes $N^{1,j}$ with negative $\Delta\lambda^{1,j}$, a back-pressure should be performed to all (if needed) so as to increase their value up to some negative threshold. We note that the total back-pressure from $N^2$ will be divided between its lower order neighbors proportionally to their (negative) value $\Delta\lambda$, where a higher absolute value should result in a higher back pressure.

After performing the above steps, $N^2$ performs an individual volume reduction (if still needed) according to the resulting updated parameters. This operation is applied as the last one, as by applying such a reduction, the first term Q1 of the quality function is reduced, resulting in a maximal decrease of the overall system quality.

The algorithm specified above can also be applied to nodes belonging to more than three levels of hierarchy. In this case, the parameters are only changed according to which the global $\tilde{\lambda}$ and different local $\tilde{\lambda}^j$ are calculated. These parameters will include the state of all nodes in the respective hierarchy levels. The rest of the operations remain identical, involving only request for change in rates of adjacent nodes.

As indicate above, it is emphasized that a similar algorithm can be applied also to other distributed networks such as an inverse flow case of a multicast transmission. In that case, a node $N^2$ should consider the parameters of a single transmitter $N^1$, but of many receivers $N^{3,1}, \ldots, N^{3,k}$. The rest of the calculations and decisions would remain identical.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    obtaining parameters, from specified neighboring node of a plurality of nodes, each one of the plurality of nodes having a buffer and a plurality of inputs and outputs and further located in a communication network configured to deliver messages from at least one source to at least one sink, the parameters comprising: (i) a buffer space, (ii) an input rate, (iii) an output rate, and (iv) a state of messages in the buffer indicative of a number of messages of each attribute;
    calculating a virtual overall volume reduction ratio associated with a virtual node being all of the specified nodes combined together, wherein the virtual reduction ratio represents the ratio of data to be reduced from a buffer in order to avoid buffer overflow, based on (i) a total buffer space, (ii) a total size of the messages, (iii) an input rate, and (iv) an output rate, all of the virtual node;
    deriving, for each one of the specified nodes, a virtual volume reduction ratio, representing a share of the node in the virtual overall volume reduction ratio;
    calculating, for each one of the specified nodes, an effective individual volume reduction ratio being the ratio of data the node should discard from its buffer had it been alone in the communication network, in order to avoid buffer overflow;
    calculating, for each one of the specified nodes, a ratio delta being a difference between the effective and the virtual reduction ratios;
    in a case the ratio delta is non-positive, for each one of the specified nodes:
    (i) applying a data reduction to the buffer; and
    (ii) applying a forth pressure to each one of the neighboring nodes located closer to the source that are further associated with a positive ratio delta by increasing their output rates; and
    in a case the ratio delta is positive, for each one of the specified nodes:
    (i) in a case that the ratio delta of a neighboring node closer to the sink is negative, performing a forth pressure by increasing the output rate of the node, thus increasing the input rate of the neighboring node closer to the sink;
    (ii) in a case that the ratio delta of any of the neighboring nodes closer to the source is negative, performing a back pressure by decreasing their respective output rates.

2. The method according to claim 1, further comprising: calculating a general quality function based on weighted attributes of the messages and respective costs for delivering each one of the messages in its respective delay of transmission from the source to the sink, to yield a quality level of data received by the sink in terms of the attributes and the delays, wherein at least one of: the forth pressure, the back pressure, and the volume reduction, is carried out by the plurality of nodes and ordered such that the quality level is maximized.

3. The method according to claim 1, wherein the deriving of the virtual volume reduction ratio, for each one of the plurality of nodes, is carried out by: (i) determining a total number of messages of each attribute in all of the buffers, (ii) reducing the messages according to the attributes, and (iii) following a buffer origin of each message to derive an amount of messages that should be reduced from each buffer.

4. The method according to claim 1, further comprising updating the parameters after the at least one of: the forth pressure, the back pressure, and the data reduction; and repeating the obtaining, the deriving, each one of the calculating, and each one of the applying, respectively.

5. The method according to claim 1, further comprising, in the case the ratio delta is positive and a data reduction is still required, updating the parameters and applying a data reduction to the buffer.

6. The method according to claim 1, wherein in the case the ratio delta is non-positive, the applying of the forth pressure to each one of the neighboring nodes located closer to the source that are further associated with a positive ratio is carried out relatively to respective their ratio delta.

7. The method according to claim 1, wherein in the case the ratio delta is positive and further in the case that the ratio delta of any of the neighboring nodes located closer to the source is negative, the decreasing of their respective output rates is carried out relatively to their respective ratio delta.

8. The method according to claim 1, wherein the attributes of the messages include priority levels associated with the messages.

9. The method according to claim 1, wherein the virtual node comprises neighboring nodes associated with adjacent levels of hierarchy within the communication network, associated with some or all of the nodes within some or all of the levels of hierarchy of the communication network.

10. A communicating network comprising:
one or more sources;
one or more sinks; and
a plurality of nodes, each node having a buffer, a microprocessor and a plurality of inputs and outputs and further configured to deliver messages from the one or more sources to the one or more one sinks,
wherein each one of the plurality of nodes is further configured to:
(a) obtain from a specified number of neighboring nodes of the plurality of nodes, parameters comprising: (i) a buffer space, (ii) an input rate, (iii) an output rate, and (iv) a state of messages in the buffer indicative of a number of messages of each attribute;
(b) calculate a virtual overall volume reduction ratio associated with a virtual node being the specified neighboring nodes combined together, wherein the virtual reduction ratio represents the ratio of data to be reduced from a buffer in order to avoid buffer overflow, based on (i) a total buffer size, (ii) a total size of the messages, (iii) an input rate, and (iv) an output rate, all of the virtual node;
(c) deriving, for each one of the specified nodes, a virtual volume reduction ratio, representing a share of the node in the virtual overall volume reduction ratio;
(d) calculating, for each one of the specified nodes, an effective individual volume reduction ratio being the ratio of data the node should discard from its buffer had it been alone in the communication network, in order to avoid buffer overflow;
(e) calculating, for each one of the specified nodes, a ratio delta being a difference between the effective and the virtual reduction ratios,
wherein in a case the ratio delta is non-positive, each one of the specified nodes is configured to:
(iii) apply a data reduction to its buffer; and
(iv) apply a forth pressure to each one of its neighboring nodes located closer to the source that are further associated with a positive ratio delta by increasing their output rates; and
wherein in a case the ratio delta is positive, each one the nodes is configured to:
(i) in a case that the ratio delta of a neighboring node closer to the sink is negative, perform a forth pressure by increasing the output rate of the node, thus increasing the input rate of the neighboring node located closer to the sink; and
(ii) in a case that the ratio delta of any of the neighboring nodes located closer to the source is negative, perform a back pressure by decreasing their respective output rates.

11. The communicating network according to claim 10, wherein the communication network is further configured to calculate a general quality function based on weighted attributes of the messages and respective costs for delivering each one of the messages in its respective delay of transmission from the source to the sink, to yield a quality level of data received by the sink in terms of the attributes and the delays, wherein the plurality of nodes are further configured to synchronize and carry out at least one of: the forth pressure, the back pressure, and the volume reduction, by the plurality of nodes are carried out and ordered such that the quality level is maximized.

12. The communicating network according to claim 10, wherein the node is configured to derive the a virtual volume reduction ratio for each one of the plurality of nodes, by: (i) determining a total number of messages of each attribute in all of the buffers, (ii) reducing the messages according to the attributes, and (iii) following a buffer origin of each message to derive an amount of messages that should be reduced from each buffer.

13. The communicating network according to claim 10, wherein each node is further configured to update the parameters after the at least one of: the forth pressure, the back pressure, and the data reduction; and repeat the obtaining, the deriving, each one of the calculating, and each one of the applying, respectively.

14. The communicating network according to claim 10, wherein in the case the ratio delta is positive and data reduction is still required, the node is configured to update the parameters and apply a data reduction to the buffer.

15. The communicating network according to claim 10, wherein the attributes of the messages include priority levels associated with the messages.

16. The communicating network according to claim 10, wherein the virtual node comprises neighboring nodes associated with adjacent levels of hierarchy within the communication network, associated with some or all of the nodes within some or all of the levels of hierarchy of the communication network.

17. A computer program product for managing data flow between a plurality of neighboring nodes, each node having a buffer and a plurality of inputs and outputs and further located in a communication network configured to deliver messages from at least one source to at least one sink, the computer program product comprising:
a computer readable storage device having computer readable program embodied therewith, the computer readable program comprising:
computer readable program configured to obtain parameters, from a number of specified nodes of the plurality of neighboring nodes, the parameters comprising: (i) a buffer space, (ii) an input rate, (iii) an output rate, and (iv) a state of messages in the buffer indicative of a number of messages of each attribute;
computer readable program configured to calculate a virtual overall volume reduction ratio associated with a virtual node being all of the specified neighboring nodes combined together, wherein the virtual reduction ratio represents the ratio of data to be reduced from a buffer in order to avoid buffer overflow, based on (i) a total buffer space, (ii) a total size of the messages, (iii) an input rate, and (iv) an output rate, all of the virtual node;
computer readable program configured to derive, for each one of the specified nodes, a virtual volume reduction ratio, representing a share of the node in the virtual overall volume reduction ratio;
computer readable program configured to calculate, for each one of the specified nodes, an effective individual volume reduction ratio being the ratio of data the node should discard from its buffer had it been alone in the communication network, in order to avoid buffer overflow;
computer readable program configured to calculate, for each one of the plurality of nodes, a ratio delta being a difference between the effective and the virtual reduction ratios;
computer readable program configured to, in a case the ratio delta is non-positive, for each one of the plurality of the nodes:
(v) apply a data reduction to the buffer; and (vi) apply a forth pressure to each one of the neighboring nodes located closer to the source that are further associated with a positive ratio delta by increasing their output rates; and
    computer readable program configured to, in a case the ratio delta is positive, for each one of the plurality of the nodes:
(i) in a case that the ratio delta of a neighboring node closer to the sink is negative, perform a forth pressure by increasing the output rate of the node, thus increasing the input rate of the neighboring node closer to the sink;
(ii) in a case that the ratio delta of any of the neighboring nodes closer to the source is negative, perform a back pressure by decreasing their respective output rates.

18. The computer program product according to claim 17, further comprising: computer readable program configured to calculate a general quality function based on weighted attributes of the messages and respective costs for delivering each one of the messages in its respective delay of transmission from the source to the sink, to yield a quality level of data received by the sink in terms of the attributes and the delays, wherein at least one of: the forth pressure, the back pressure, and the volume reduction, is carried out by the plurality of nodes and ordered such that the quality level is maximized.

19. The computer program product according to claim 17, wherein the deriving of the virtual volume reduction ratio, for each one of the plurality of nodes, is carried out by: (i) determining a total number of messages of each attribute in all of the buffers, (ii) reducing the messages according to the attributes, and (iii) following a buffer origin of each message to derive an amount of messages that should be reduced from each buffer.

20. The computer program product according to claim 17, further comprising computer readable program configured to (i) update the parameters after the at least one of: the forth pressure, the back pressure, and the data reduction; and (ii) repeat the obtaining, the deriving, each one of the calculating, and each one of the applying, respectively.

21. The computer program product according to claim 17, further comprising, in the case the ratio delta is positive and a data reduction is still required, computer readable program configured to update the parameters and apply a data reduction to the buffer.

22. The computer program product according to claim 17, wherein in the case the ratio delta is non-positive, the applying of the forth pressure to each one of the neighboring nodes closer to the source that are further associated with a positive ratio is carried out relatively to respective their ratio delta.

23. The computer program product according to claim 17, wherein in the case the ratio delta is positive and further in the case that the ratio delta of any of the neighboring nodes closer to the source is negative, the decreasing of their respective output rates is carried out relatively to their respective ratio delta.

* * * * *